Oct. 26, 1971  M. E. DOUGLASS  3,614,887
BITE FOR LIQUID LEVEL AND QUANTITY MEASURING SYSTEM
Filed May 13, 1969  2 Sheets-Sheet 1
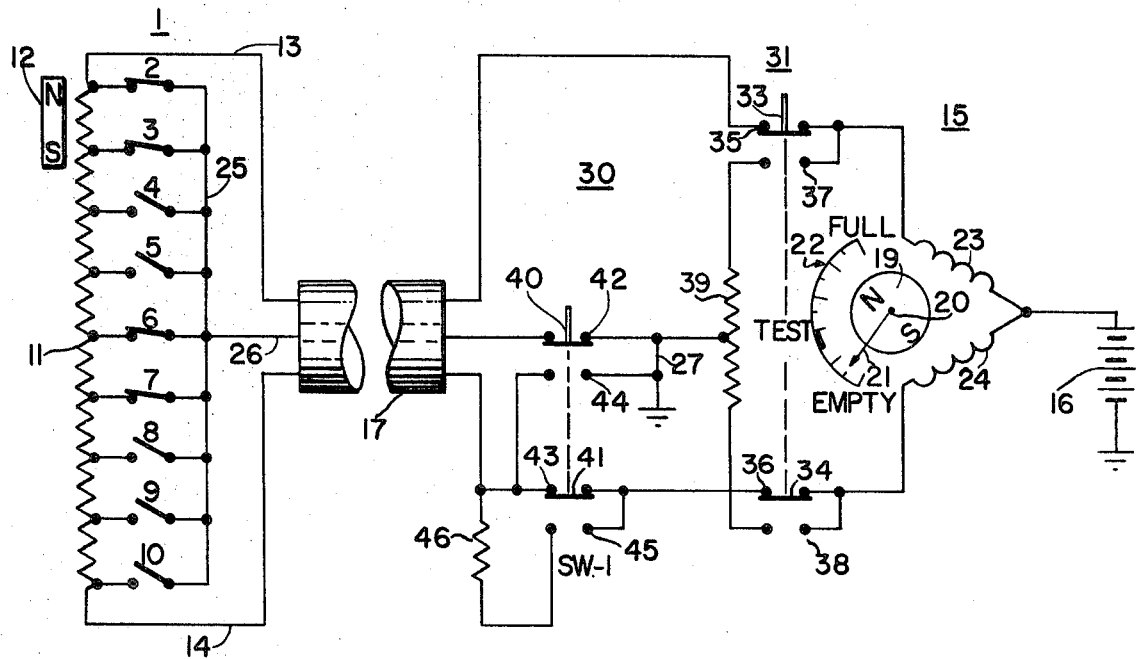
FIG. 1
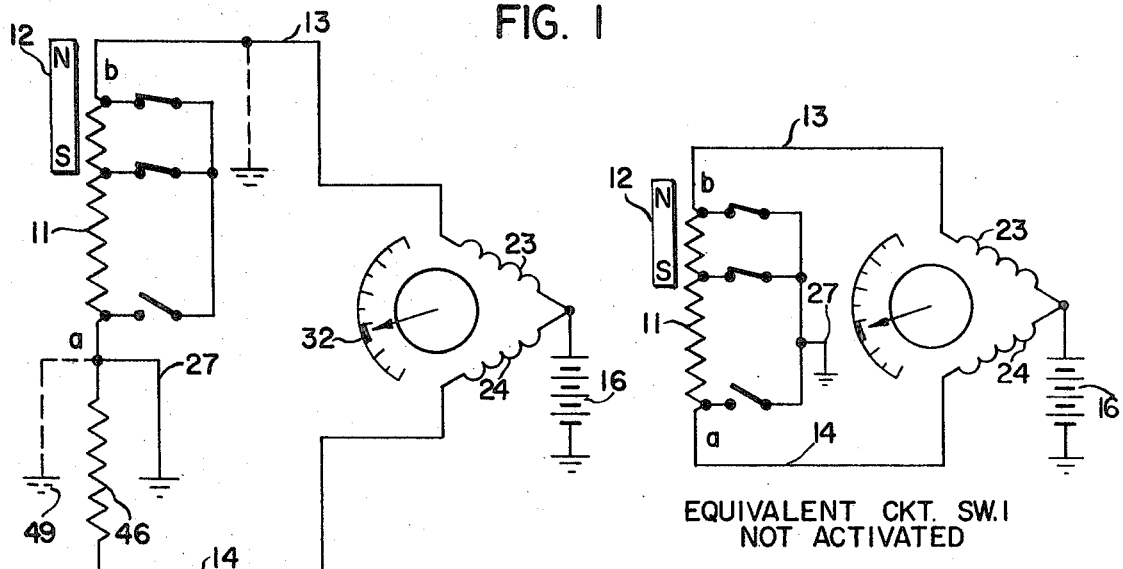
EQUIVALENT CKT. SW.1
ACTIVATED
FIG. 1B
EQUIVALENT CKT. SW.1
NOT ACTIVATED
FIG. 1A
INVENTOR.
MALCOLM E. DOUGLASS
BY *David Blumenfeld*
ATTORNEY

EQUIVALENT CKT.
SW.1 ACTIVATED
SW.2 NOT ACTIVATED

EQUIVALENT CKT.
SW.1 AND SW.2 BOTH ACTIVATED

INVENTOR.
MALCOLM E. DOUGLASS
BY
ATTORNEY

United States Patent Office 3,614,887
Patented Oct. 26, 1971

3,614,887
BITE FOR LIQUID LEVEL AND QUANTITY MEASURING SYSTEM
Malcolm E. Douglass, Wenham, Mass., assignor to General Electric Company
Filed May 13, 1969, Ser. No. 824,105
Int. Cl. G01f 25/00
U.S. Cl. 73—1 R ............................... 8 Claims

ABSTRACT OF THE DISCLOSURE

Test equipment which is permanently built into the instrument permits in situ testing of the instrument sensor and indicator without using auxiliary test equipment or removing the instrument from service. The built-in test equipment is designed for use with an instrument of the type utilizing an impedance element in the sensor. It includes a test impedance of known magnitude which is permanently associated with the instrument. The test impedance is selectively switched into the circuit with the sensing impedance. If the sensing impedance is functioning properly, the two impedances in the circuit will produce a pre-set response on the instrument indicator. This shows the operator that his instrument is functioning properly. If, however, a fault is present, the instrument indicator does not show the pre-set response providing thereby an immediate indication of the presence of a fault.

---

This invention relates to an instrument and, more particularly, to one containing built-in test equipment to determine whether the instrument is functioning properly.

Although the instant invention is applicable to a wide variety of instruments which are useful in measuring any number of different quantities or parameters, the invention, for the sake of clarity and simplicity will, be described in connection with a liquid level measuring instrument. It will be understood however, that the invention is not limited to liquid level measuring instruments, but is useful with any instrument utilizing an impedance as the sensing element to produce any electrical output.

In almost all circumstances where instruments are utilized, it would be desirable to provide some effective means by which the instrument can be tested to determine whether it is functioning properly without taking it out of service. In some applications, the need is sufficiently acute to transcend the merely desirable. Illustrative of one area of use where the need for in situ testing is very acute is aircraft instrumentation. For example, where a liquid level instrument is utilized in an aircraft to determine oil level, or the fuel level, etc., it is most important that testing be carried out without having to remove the instrument from the aircraft. If the instrument must be removed for testing, then obviously such testing can take place only when the aircraft is not in operation. Since this is not a desirable situation, it is very important in environments such as those on an aircraft, that some means be provided for testing instruments of this type in situ without having to remove the instrument from the aircraft or the aircraft engine.

Above and beyond the need for testing instruments without removing it from the aircraft, it would also be preferable if these tests could be carried out without the use of auxiliary test equipment.

Hitherto, attempts were made to solve the problem of testing by providing the instrument with test points or jacks to permit testing without removing the instrument from the environment. However, such an approach requires auxiliary test equipment such as probes, voltameters, ammeters, etc., which then makes testing very cumbersome, complex and often difficult procedure.

However, a more subtle shortcoming is that this still requires taking the instrument out of service, and thus limits testing to those occasions when the aircraft is grounded, i.e. when it is undergoing routine maintenance. It is immediately apparent that if auxiliary test equipment must be used, it is difficult, if not impossible to test the instrument when the aircraft is in operation since there is usually neither the space, time, nor the facility in the cockpit for the test equipment. Hence, testing is limited to those occasions when the craft is not in operation.

It is therefore, a principal objective of the instant invention to provide an instrument and associated test equipment in which the instrument may be tested in situ without taking the instrument out of service;

It is a further objective of this invention to provide an instrument with associated test equipment where the test equipment is permanently associated with the instrument;

Yet another objective of the invention is to provide an instrument with built-in test equipment in which parts of the instrument itself are utilized for carrying out the test.

FIG. 1 shows a schematic diagram of a reed-switch type of liquid level indicating instrument containing a built-in test equipment;

FIGS. 1a and 1b show the equivalent circuits for the instrument with the sensor test switch in the actuated and unactuated positions;

Figure 2:
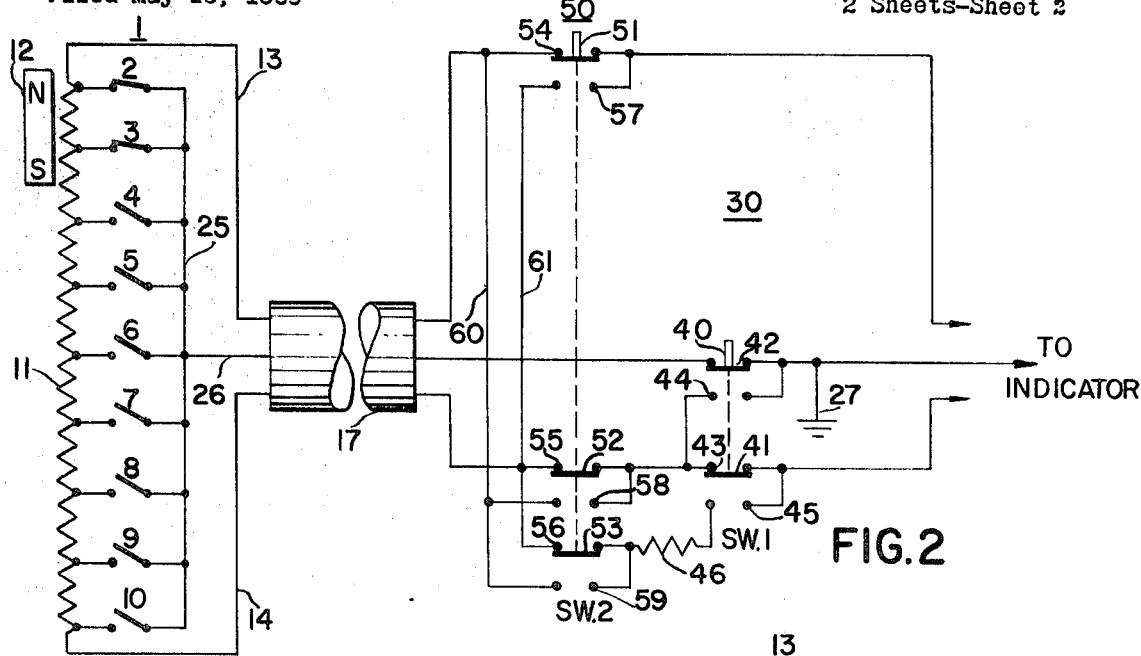
FIG. 2 shows the liquid level instrument of FIG. 1 with an alternative embodiment of the built-in test equipment.

FIG. 1 illustrates one form of the invention, and shows a liquid level measuring instrument of the float-magnet, reed-switch type which includes built-in test equipment for in situ testing of both the sensor and indicator. The sensor 1 is of the type utilizing an impedance element to provide an output in the form of an impedance, current, or voltage which is related to the quantity being measured. The sensor consists of an array of normally open reed switches 2–10 which are uniformly spaced from top to bottom of a tank or container, such as an oil or fuel tank. The switches are connected to a resistive element 11 which constitutes the sensing impedance A magnet 12 is supported on a float, not shown, which follows the level of the liquid surface in the tank so that one or more of the switches 2–10, corresponding to the liquid surface level are closed and provide an electrical output quantity (voltage, in this instance) which is related to the liquid level. The resistance element 11 is connected through leads 13, 14 and 26 to an indicator device 15 and a DC power supply 16 which, for the sake of simplicity is shown as a battery. Indicator 15, in the case of an aircraft, is mounted in an instrument panel either at the pilot's or the engineering officer's position. The indicator may, therefore, be mounted a substantial distance from the sensor which, as pointed out above, is positioned in a tank or oil sump either in the wings or engine of the aircraft. Hence, leads 13, 14 and 26 are brought through a suitable cable shown schematically at 17 from the sensor to the instrument display panel in the cockpit.

The indicator or display unit 15 may obviously be one of many well-known types. The illustrated form of the indicator is a ratio meter comprising a permanent magnet rotor 19 mounted on a rotating shaft 20. Shaft 20 carries a pointer 21 to provide along with a calibrated dial 22 an indication of the level of the liquid being measured. The rotor and pointer are magnetically locked in a position depending on the distribution of the magnetic flux generated by a pair of coils 23 and 24. As shown, coils 23 and 24 have a common connection to the positive terminal of the DC power supply 16 and have their other ends connected to sensor 1 through leads 13 and 14.

The fluid level indicator thus far described is one illustrated in Pat. No. 3,200,645 issued Aug. 17, 1965 in the name of David B. Levins and entitled "Electric Position Sensor," and is assigned to the assignee of the present invention. A modified version of the sensor described in the Levins' patent is also shown and described in an article appearing on page 87 of the March 1967 issue of Instruments and Controls Systems, vol. 40. Reference is hereby made to the Levins' patent and the cited article.

In normal operation, magnet 12 is positioned to correspond to the level of the liquid being measured and closes one or more of the switches 2–10. Reed switches 2–10 each have one contact element connected to resistance 11 and the other contact element connected to a common bus 25 which is connected through lead 26 to a point of reference potential 27, such as ground. As the reed-switches are closed, resistance 11 is grounded at a point determined by the level of the liquid. The magnitude of the resistance in series with each of the indicator coils 23 and 24, and hence, the current flowing through these coils, depends on the position of the ground along resistance 11 and provides an indication of the level of the liquid being measured. As shown in FIG. 1, if reed relays 2 and 3 are closed by magnet 12 (when that magnet is at its highest position) current flows from the positive terminal of the supply voltage, through coil 23 over lead 13 and through closed reed-switch 2 to ground. Thus, there is a minimum amount of resistance in circuit with coil 23 and the current flow is maximum. The current flow through coil 24, on the other hand, is from the positive terminal of the DC power supply, over lead 14, through virtually all of resistor 11 and thence through closed reed-switch 3 to ground. It can be seen that the maximum amount of resistance is in series with coil 24 so that the current flow through that coil is at a minimum. In this situation, coil 23 has a maximum effect and pointer 21 is deflected to its uppermost condition indicating that the tank is full.

Similarly, as the magnet moves between the two extremes, the amount of resistance in series with each of the coils 23 and 24 varies, thereby varying the current through these coils and positioning the pointer to provide an accurate indication of the liquid level.

Sensor 1 and the indicator display unit 15, making up the liquid level measuring instrument, will function properly only as long as the sensor and the indicator are both fault-free. In order to determine that the instrument is operating properly and to test both sensor element 1 and indicator 15, built-in test impedances 39 and 46 are provided which are selectively connected to the sensor and the indicator for testing each of these instrument components. The test impedance 46 when connected to the sensor bears a predetermined relationship to the magnitude of the sensor impedance. If there is no fault in the sensor, the currents flowing in the indicator coils have predetermined value so that the pointer deflects to a known "test" position. If there is a fault, the relationship between the sensor and the test impedance no longer holds true and the pointer is not deflected to the "test" position providing thereby an immediate and positive indication of a fault in the sensor.

In testing the indicator on the other hand, the sensor is disconnected from the indicator and a test impedance element is connected to the indicator. The test impedance is of such a value that it produces the desired current and pointer deflection to position it at the "test" position. If the pointer is not deflected to the "test" position, a clear and positive indication is provided that there is a fault in the indicator.

The two test impedances 39 and 46 (which are shown as resistors), are brought into operation by a pair of switching means 30 and 31 connected between the sensor and indicating means. These switching means are selectively actuated to test the sensor and the indicator respectively to determine if the instrument is operating properly and, if not, which one of the components is at fault.

A sensor of the type shown in FIG. 1 is potentially subject to a number of possible faults each of which will result in an erroneous indication. Thus, for example, one or more of the reed-switches may be stuck in the closed position grounding a point along the resistor which bears no relation to the actual position of the magnet and the level of the liquid in the tank. Also, the resistance may be shorted to ground at any point along the resistor at the ends of the resistor, or at leads 13 or 14. Similarly, an open circuit in ground lead 26 may produce an erroneous indication. In addition, from time to time, some fault may develop in the indicator unit 15 so that an erroneous indication is produced even though the sensor is functioning properly and transmitting the proper electrical signal which accurately reflects the level of the liquid. Hence, the test impedances 39 and 46 are selectively connected to the indicator and sensor to determine whether they are operating properly.

Switching means 31 is provided to disconnect the sensor from the indicator unit and connect test impedance 39 across the indicator. Test impedance 39 is a resistor grounded at one point. The two resistor components have values such that the current through coils 23 and 24 position the pointer 21 in a "test" position 32 on the indicator scale. If the indicator or display unit is not functioning properly, the pointer will not be deflected to test position 32 thereby indicating to the pilot or to the person testing the instrument that a fault has developed in the indicator. Switch means 31 consists of a pair of single pole-double-throw switches 33 and 34 which in FIG. 1 are shown as ganged push buttons. Contact pairs 35 and 37 and 36 and 38 are respectively associated with switches 33 and 34. It will be apparent that when switches 33 and 34 are positioned against contacts 35 and 36, coils 23 and 24 are connected to the sensor through leads 13 and 14 and the instrument is operating in its normal mode. When indicator 15 is to be tested, switches 33 and 34 are connected respectively to contacts 37 and 38 thus disconnecting the sensor and connecting the test impedance to the indicator. Test impedance 39, which is shown in FIG. 1 as a resistor is grounded at an intermediate point so that the resistor is divided into two resistance components having a predetermined ratio. It will be apparent from inspection, that the currents flowing through coils 23 and 24 depend on the ratio of the resistances and the ratio is so chosen that with the indicator operating properly, the currents will deflect rotor 19 and pointer 21 to "test" position 32 showing that the indicator is functioning properly. If there is a fault in the indicator, then the current through the individual coils will not be in the proper ratio and the pointer will be deflected to a position other than the test position showing that there is a fault in the indicator.

Switch means 30, on the other hand, will when actuated, permit in situ testing of the sensor by connecting a test impedance, which also takes the form of a resistor to sensor 11. Ground terminal 27 is switched from lead 26 to the junction of resistor 11 and the test resistor with the other ends of the resistors being connected respectively through leads 13 and 14 to coils 23 and 24 of the indicator. With a known ratio between the test and sensor impedances, the current flowing through the coils are such that the indicator pointer is deflected to test position 32 only if the sensor is functioning properly. If some fault has developed in the sensor, pointer 21 is not properly positioned, thereby providing an indication of a fault in the sensor. Switch means 30 includes ganged switch indicated generally as SW–1 having a pair of ganged single pole-double-throw switches 40 and 41 (which are again shown as push buttons). Associated with the switches are the contacts 42 and 43 and 44 and 45. Contacts 42, associated with switch 40 are connected between the ground terminal 27 and the common bus reed-switch through lead 26 while contacts 44 are connected between the grounded terminal and lead 14. Switch 41 when positioned against contacts 43 connects lead 14 to coil 24. Contacts 45 and test resistor 46 are connected across contacts 43. It will be apparent that actuation of the switches 40 and 41 transfers the ground terminal from lead 26 and common bus 25 to lead 14 and connects test resistor 46 in series between the now grounded lower end of resistance 11 and one end of coil 24. With the two switches actuated, resistors 11 and 46 are connected between the ends of coils 23 and 24 with the junction of these resistors being grounded. The currents flowing through coils 23 and 24 are proportional to resistance ratio of resistor 11 and test resistor 46. If resistor 11 forming part of the sensor is functioning properly, the ratio of the currents flowing through the coils will be such as to deflect pointer 21 to "test" position 32 to provide a visual indication that the sensor is functioning properly. If some fault has developed in the sensor, the ratio of resistances and hence, the currents flowing through coils 23 and 24 are no longer of the proper value and pointer 21 is deflected to a position other than "test" position 32 thereby indicating a fault within the sensor element.

Operation of the switch means 30 and the mechanically interlocked switch SW-1 may perhaps be best understood in connection with FIGS. 1A and 1B which show equivalent circuit diagrams representing electrical conditions as the switches are in their actuated and unactuated states. FIG. 1A shows the equivalent circuit of the instrument with the test switch means not actuated so that the instrument functions normally. That is, switch 40 is positioned against contacts 42 thereby connecting common bus 25 to ground. Similarly, switch 41 is positioned against contacts 43 so that the lower end A of resistor 11 is connected to coil 24 and the upper end B of the sensor resistor is connected to coil 23. The current flow through these coils and the position of the pointer 21 is determined by the position of magnet 12 and the closure of the reed switches.

When the switch means is actuated to provide in situ testing of the sensor, switch 40 moves from contacts 42 against contacts 44 removing ground from bus 25 and connecting it to lead 14 and the lower end of sensor resistor 11. Similarly, switch 41 is now positioned against contacts 45 connecting test resistor 46 between the grounded end of resistor 11 and coil 24. Thus, as shown in FIG. 1B resistor 11 and resistor 46 are respectively connected to coils 23 and 24 with the junction of these resistors being a ground potential through the action of the switch 40 and contacts 44. The resistors are so chosen that as long as the sensor is fault free, the current in coils 23 and 24 deflects pointer 21 to the "test" position 32 thereby indicating that the system is operating properly. If there is a fault, however, such as some of the reed switches failing in the closed position and shorting out a portion of the sensor resistance, the resistance ratio is no longer of the proper value to produce a deflection which positions the pointer of the instrument in the "test" position. There is, therefore, an immediate indication that a fault has developed in the sensor. Similarly, if resistor 11 is shorted to ground at any point but the lower end A, the resistance ratio and the current through coils 23 and 24 changes sufficiently to provide an indication of a fault in the sensor.

If no fault indication is obtained during in situ testing of the sensor, the switch is released and the instrument reverts to its normal operating condition. It can now be seen that the built-in test equipment described and illustrated in FIG. 1 provides a simple, effective means of testing of an instrument in situ without removing the instrument, without interfering with its overall operation and without the use of auxiliary test equipment. Furthermore, it is obvious that this allows testing of the instrument while the vehicle, device, system or arrangement, etc. on which the instrument is mounted, is in normal operation. Thus, in the case of an aircraft, the pilot may at any time, either on the ground or in the air, test the condition of his instruments simply by depressing the two test buttons in sequence and determine thereby whether the sensor and the indicator are functioning properly.

In describing the operation of the sensor test equipment in connection with FIG. 1, it was pointed out that the present arrangement will indicate the presence of a faulty reed which fails in the closed position. It will also be apparent however, that the system will provide an indication of such a faulty reed only if such reed is not immediately adjacent to the magnet because obviously reeds adjacent to the magnet are in the closed position in accordance with the normal operation of the device. If the faulty reed is located away from the magnet, then additional portions of the shorted and the ratio of the resistances will be disturbed sufficiently to produce a fault indication by pointer 21.

Also, in describing the manner in which the system operated to detect and indicate certain faults, it was pointed out that a short circuit to ground at any position along resistance 11 including the upper end B will produce a fault indication since it will disturb the current ratio through the indicator coils. However, it must be noted that if the ground occurs at the lower end of the indicator resistance as shown by the dashed grounded lead 49, no indication of this fault would be provided since that point of the resistor is at ground potential during test through the action of switch 40 which transfers the ground terminal 27 to this point. Hence the built-in test equipment illustrated in FIG. 1 is not capable of providing an indication of a fault of this nature, i.e. a ground at the lower end of the sensor resistor.

The instrument with built-in test equipment illustrated in FIG. 2 is a modification of the one shown in FIG. 1 and will also provide an indication of a fault due to a short to ground at either end of sensing resistor 11. To this end, an additional switch means is provided which switches the test ground and test resistor selectively from one to the other end of the sensing resistor 11. Thus, in one position, ground and the test resistor are connected to the lower end of sensing resistor 11 while in the other ground and the test resistor are connected to the upper end of the sensing resistor. It will be obvious, therefore, that if a short at the lower end of resistor 11 is not detected in one test position, switching the test ground to the upper end of the sensing resistor will detect such a short.

FIG. 2 shows an instrument with built-in test equipment which incorporates this additional feature. For the purposes of simplicity, and ease of understanding, the same numerals are utilized for similar components. Sensor 1 again consists of a sensing impedance such as the resistor 11 having a plurality of taps thereon which are connected to a plurality of reed switches 2–10. The switches are actuated by a magnet 12 which is positioned in accordance with the level of the liquid surface being measured. All of the reed-switches are also connected to a common bus 25 which is connected to a grounded terminal 27 through a lead 26. The opposite ends of the sensing resistor 11 are connected through leads 13 and 14 and cable 17 to an indicator not shown here, but which is of the type illustrated in FIG. 1.

A switching means 30 for testing the sensor element in situ is provided and as pointed out previously, tests the sensor by connecting a test impedance such as test resistor 46 in series with sensing resistor 11 and by grounding the junctions of these two resistors at the lower end A of sensing resistor 11. Switch 30 (also designated as SW-1) again consists of two single pole-double-throw switches 40 and 41. Contacts 42 and 43 and contacts 44 and 45 are respectively associated with switches 40 and 41. With Switch SW-1 in the unactuated position, the sensor operates in its normal measuring mode with the grounded terminal 27 connected through switch 40, contacts 42 and lead 26 to the common bus 25. Coil 24 of the indicator is connected through switch 41, contacts 43; a pair of normally closed contacts 52 forming part of the auxiliary switch 50 presently to be described, and a lead 14 to the lower end of the sensing resistor 11. In this condition, the sensor is operating in its usual mode and determines the level of the fluid being measured by the position of the magnet and the closure of the associated reed-switches.

Figure 2A:
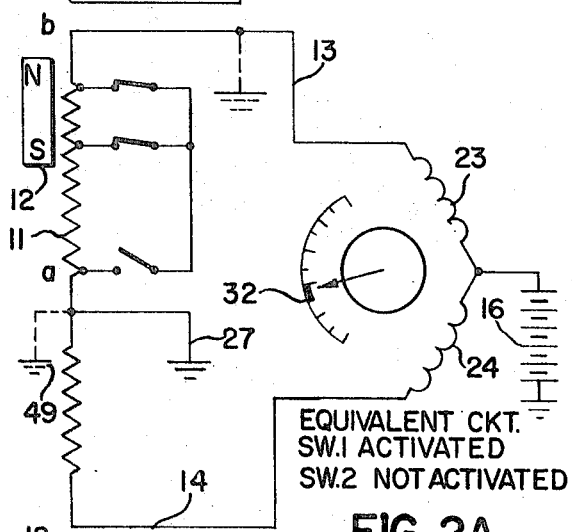
FIGS. 2a and 2b show the equivalent circuits for the instrument and test equipment with the test switches in the actuated and unactuated positions.

With switch SW-1 actuated, switches 40 and 41 are moved from contacts 42 and 43 to contacts 44 and 45. Ground terminal 27 is disconnected from common bus 25 and connected to lead 14, through contacts 52 and then to the lower end of resistor 11. Similarly, resistor 46 is connected through contacts 45, contacts 53 of switch 50 and lead 14 to the lower end of resistor 11. The equivalent circuit of the sensor and the built-in test instrument with SW-1 actuated is as shown in FIG. 2A with test resistor 46 connected to the grounded lower end of resistor 11. Hence, the current flow through coils 23 and 24 of the indicating instrument depends on the ratio of the resistances and will produce indication of any fault in the sensor except for a short of the sensing resistor to ground at lower end A; a condition indicated by the dashed ground 49.

An additional switching means 50 (also designated as test switch SW-2) is provided to permit a second testing sequence which will permit detection of a fault such as a ground at the lower end of the test resistor. This is achieved by switching the ground and the test resistor from one end of resistor 11 to the other. Switching means 50 consists of three ganged single pole-double-throw switches 51, 52, and 53. Switches 51, 52, and 53 are normally positioned against contacts 54, 55 and 56 which are respectively connected in series with leads 13, 14 and test resistor 46. Additional contacts 57, 58 and 59 are associated respectively with switches 51, 52 and 53. As pointed out above with SW-1 actuated and SW-2 not actuated, the equivalent circuit of the instrument and the test equipment is as shown in FIG. 2A. In order to test for a ground fault at the lower end of resistor 11, switch means SW-2 is also actuated. Switch 52 is moved to contacts 58 and this removes ground from lead 14 and the lower end of resistor 11. That is, ground terminal 27 is now connected through switch 40, contacts 44, switch 52, contacts 58 and leads 60 and 13 to the upper end of the sensor. Thus, the ground terminal has been moved from the lower to the upper end of the sensing resistor. Movement of ganged switch 53 against contacts 59 connects resistor 46 to the upper end of sensor 11 over leads 60 and 13. It can be seen that the test resistor and ground have been switched from the lower end to the upper end of the sensing resistor 11. Simultaneously, movement of switch 51 to contacts 57 connects the lower end of resistor 11 and lead 14 to coil 24 of the instrument. This cross-switching of the output leads is to insure that current flow through indicator coils 23 and 24, now shown, is still controlled by the ratio of resistors 11 and 46 respectively even though the resistor connections have been switched. Thus, since the proper position of pointer 21 in the test mode depends on the proper current ratio switching of the resistor connections makes it necessary to switch the leads. Otherwise, an erroneous indication will be obtained.

Figure 2B:
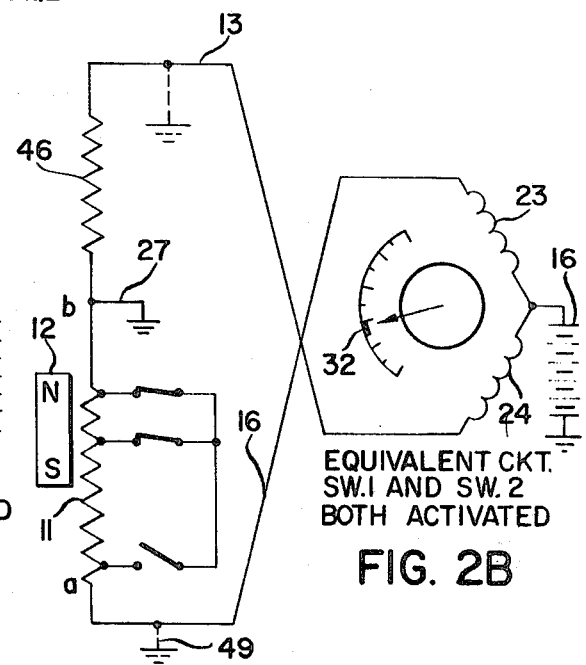

FIG. 2B illustrates the equivalent circuit of the instrument with both switches SW-1 and SW-2 actuated. With both of these switches actuated, ground terminal 27 is connected through switch 40, contacts 44, switch 52, contacts 58 to the upper end B of sensing resistor 11. Similarly, one end of test resistor 46 is also connected to the upper end B of the sensing resistor through switch 53, contacts 59 and lead 60. The lower end A of resistor 11 is connected through leads 14, switch 51 and contacts 57 to coils 23. Thus, ratio of the currents in coils 24 and 23 is still the same relation to resistors 46 and 11 even though the resistor connections have been switched, and hence if correct, will provide indication at the "test" position on the indicator scale.

It will now be apparent from FIG. 2B that a short 49 at the lower end A of test resistor 11 will now produce a fault indication. With a short at this position, the current through coil 23 is at a maximum since sensing resistor 1 has been shorted out. Pointer 21 does not move to "test" position 32 and this provides an indication that the sensor is not functioning properly. Thus, by means of this additional test position means, a short at either the lower or upper ends of sensing resistor 11 may be detected.

Figure 3:
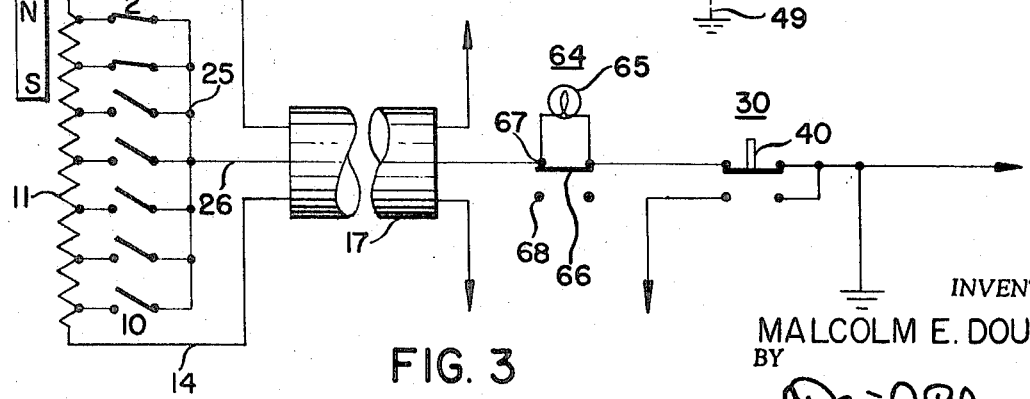
FIG. 3 is a fragmentary showing of yet another embodiment of an instrument with built-in test equipment.

FIG. 3 illustrates, in fragmentary form, yet another embodiment of the invention, which adds another element of sophistication and flexibility to the testing arrangement. The modification of FIG. 3 is intended to provide a positive indication of one additional fault condition which is indicated only indirectly by the arrangements illustrated in FIGS. 1 and 2. That is, if the sensor fault is an open circuit between the ground terminal 27 and common bus 25, then actuation of the built-in test equipment will not provide any direct indication of this condition. This condition will be detected indirectly because an open circuit between the ground terminal and the common bus of the reed-switches will obviously remove all power from the sensor. No current at all will flow through the indicator coils of the indicator in normal operation so that the pointer 21 will move to a position below the zero or empty point indicating that somehow power has been lost. However, this is a secondary or indirect indication and it may often be preferable to provide an indication which is a positive indication that the fault is an open circuit between the ground terminal and the sensor. To this end, an additional switch means is incorporated in lead between grounded terminal and the common bus which has an indicator light associated therewith. Under normal operations, the indicator light is shorted out and de-energized. When it is desired to test the continuity of the ground lead, the switch means is actuated removing the short from the indicating means. If there is circuit continuity between the grounded terminal and the rest of the circuitry, energy will be applied to the bulb producing a positive indication of circuit continuity between the grounded terminal and the rest of the circuit. If an open circuit does exit, the light will not be energized and this failure to light is a positive determination that the fault in the sensor consists of an open circuit between the grounded terminal and the sensor element itself.

In FIG. 3, the sensing resistor 11 and reed-switches 2-10 are again connected through the output leads 13 and 14 and cable 17 to an indicator, not shown. The reeds 2-10 are connected to a common bus 25 which in turn, is connected through a lead 26 and switch 40 of sensor test switch means 30 to the ground terminal 27. Also connected in series with lead 26 and grounded terminal 27 is a further switch means shown generally at 64 which consists of a switch 66, contact pair 67 is connected in series with lead 26. Indicator element 65, which may be an incandescent bulb, neon bulb, or any other device which produces a visible indication of the flow of an electric current is connected across contact pair 67. With switch 66 positioned against 67 the current flows through the switch and indicator 65 is shorted. Whenever the continuity of the ground connections to the sensing elements is tested, switch 66 is depressed moving it away from contact 67 and against contact 68. Now the path for the current flow from the grounded terminal is through the sensing element 65 and if there is circuit continuity, the indicating means 65 will light or produce whatever indication it is capable of producing. If there is an open circuit, either at the ground terminal or anywhere between bus 25 and the ground terminal, the indicating element will not light upon actuation of switch 66 thereby providing a positive indication that an open circuit exists between the grounded terminal and the sensing element.

In describing the instant invention, and the various modifications thereof as illustrated in FIGS. 1 through 3, an arrangement has been shown in which the indicator instrument has been a ratio device in which the position of the pointer is a function of the ratio of currents flowing through the individual coils of a meter. Consequently, in the test operation, the sensor impedance being tested and the test impedance have been connected in such a manner to provide two separate currents for the indicator which have a predetermined ratio so that the pointer will be deflected to a predetermined test position. The use of such ratio meters is often preferable since the system is then insensitive to voltage variations of the power supply 16. However, it will be understood that the invention is not limited in its scope to use in connection with a ratio meter indicator and also it is not necessary that the built-in test equipment connects the sensing impedance and the test impedance in such a manner as to provide two currents which are proportional to the ratio of the impedances. It is possible to carry out the instant invention while using indicating instruments of other types. For example, a D'Arsonval type of meter may also be utilized. In the event that such a meter is utilized, it is not necessary to connect the sensing impedance and the test impedance to produce two separate currents, the ratio of which is an indication of the condition of the sensor, but the testing impedance may simply be connected either in series or in parallel with the sensing impedance to produce a predetermined current level for the meter which will produce a deflection of the pointer of a given amount if and only if the sensing impedance is operating properly. The point is that the test impedance is connected to the sensing impedance in any number of configurations to produce an output current which will have a predetermined value if the sensor is functioning properly and differ value if it is not functioning properly. This output current can either be single output current which is controlled by the sum of resistance or the equivalent resistance or may be a ratio of current determined by the resistances. The important feature is that the test impedance and the sensing impedance are combined to produce an output which can be recognized as unique only if the sensor is functioning properly.

It can be seen therefore, that applicant has provided a novel, and inventive arrangement for an instrument in which the instrument may be tested in situ without the use of auxiliary test equipment by providing components which are permanently affixed to the instrument so that the selective actuation of the testing equipment provides, in conjunction with the instrument itself, an indication of the manner in which the instrument is operating.

While there have been described above what at present is considered to be the preferred embodiments of the invention, it will be apparent to those skilled in the art that various changes and modifications may be made therein without departing from the spirit and scope of the invention.

What I declare is new and wish to secure by United States Letters Patent is:

1. In a measuring instrument having test elements permanently associated therewith to permit in situ testing of the instrument without taking it out of service the combination comprising:
    (a) a measuring instrument including
        (1) sensing means having an impedance element for producing an electrical signal in response to a quantity or parameter being measured,
        (2) indicator means connected in circuit with said sensing means to provide an indication of the quantity or parameter being measured in response to the electrical signal from said sensor,
    (b) test means permanently associated with said instrument to produce in conjunction therewith a predetermined indication if said instrument is operating properly and a different indication if a fault exists, including
        (1) test impedance means,
        (2) multi-element switching means for selectively connecting one end of the test impedance to one end of said sensing impedance and the junction of said impedance to a point of reference potential to produce said predetermined indication if said instrument is operating properly and produces a different indication as a fault indication.

2. The measuring instrument according to claim 1 wherein said sensing and test impedances are resistors and said switch means includes a multi-element switch for selectively connecting one end of the test resistor to end of said sensing resistor and connects the junction of said resistors to a point of reference potential.

3. The instrument according to claim 2 wherein the other ends of said sensing and said test resistors are connected separately to said indicating instrument whereby a pair of currents having a predetermined ratio are produced if the sensing impedance is operating properly to provide a corresponding indication on said indicator and any fault changes the current ratio and the indication.

4. The instrument according to claim 2 wherein said multi-element switch includes a first switch element for connecting a grounded terminal to one end of said sensing resistor and a second switch for disconnecting simultaneously said one end of said sensing resistor from said indicator and connecting said test resistor between said one end of said sensing resistor and said indicator.

5. The instrument according to claim 4 wherein said switch contains a further multi element switch, said further switch contains a first switch element connected to said first element of said multi element switch to connect said grounded terminal to the other end of said sensing resistor upon actuation of said further multi-element switch and a second switch element of said multi-element switch to disconnect said test resistor from said one end of said sensing resistor to the other end whereby sequential actuation of said multi-element switches connects the ground terminal and said test resistor first to one and then to the other end of said sensing resistor so that grounding of either end of said sensing resistor produces a fault indication on said indicator.

6. The instrument according to claim 4 wherein said sensing resistor includes a plurality of magnetically actuated reed-switches, means connecting one contact of each of said reed-switches to different points on said sensing resistor and the other contact through a common level to said ground terminal.

7. The instrument according to claim 6 wherein a switch means is connected between said reed-switches and said ground terminal, bulb means associated with said last named switch means, said switch upon being actuated connecting said bulb means in circuit between said reed and said ground-terminal to produce a visual indication if there is circuit continuity and no visual indication if there is an open circuit.

8. In a measuring instrument having test elements permanently associated therewith to permit in situ testing of the instrument without taking it out of service, the combination comprising:
    (a) A measuring instrument including,
        (1) Sensing means having an impedance element for producing an electrical signal in response to a quantity or parameter being measured,
        (2) Indicator means connected in circuit with said sensing means to provide an indication of the quantity or parameter being measured in response to the electrical signal from said sensor,
    (b) Test means permanently associated with said instrument to produce in conjunction therewith a predetermined indication if the indicator means of said instrument is operating properly and a different indication if a fault exists, including,
(1) Test impedance means normally disconnected from said indicator means, having an intermediate point thereon connected to ground potential to establish a predetermined ratio between the values of the impedance from the intermediate grounded point and the ends of the impedance,
(2) Multi-element switch means normally connecting said test impedance means to said (indicating) indicator means, said switch means disconnecting said sensing impedance from said indicator means upon actuation and simultaneously connecting opposite ends of said test impedance to said indicator means to establish a given current ratio through the indicator means to produce said predetermined indication of said if said indicator means is operating properly and a different indication as a fault indication.

References Cited
UNITED STATES PATENTS

| | | | |
|---|---|---|---|
| 2,459,081 | 1/1949 | Kunz | 73—1 (A) |
| 2,943,480 | 7/1960 | Nelting | 73—1 (A) |
| 3,203,223 | 8/1965 | Petrow | 73—1 (B) |
| 3,319,155 | 5/1967 | Kooiman | 73—1 (A) |

S. CLEMENT SWISHER, Primary Examiner